United States Patent
Burgstaler et al.

(10) Patent No.: US 6,923,088 B2
(45) Date of Patent: Aug. 2, 2005

(54) DEVICE FOR MOUNTING A PEDAL LEVER OF A MOTOR VEHICLE

(75) Inventors: Andree Burgstaler, Dielingen (DE); Jan Dütz, Damme (DE); Simone Pätzold, Cappeln (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 133 days.

(21) Appl. No.: 10/203,896

(22) PCT Filed: Dec. 19, 2001

(86) PCT No.: PCT/DE01/04807

§ 371 (c)(1),
(2), (4) Date: Aug. 14, 2002

(87) PCT Pub. No.: WO02/051669

PCT Pub. Date: Jul. 4, 2002

(65) Prior Publication Data

US 2003/0000335 A1 Jan. 2, 2003

(30) Foreign Application Priority Data

Dec. 22, 2000 (DE) .......................... 100 64 770

(51) Int. Cl.$^7$ ................................. G05G 1/14
(52) U.S. Cl. ............... 74/512; 74/513; 74/560
(58) Field of Search ............... 74/47 B, 512, 74/513, 560, 561

(56) References Cited

U.S. PATENT DOCUMENTS

| | | | | |
|---|---|---|---|---|
| 5,778,732 A | * | 7/1998 | Patzelt et al. .................. | 74/512 |
| 5,896,781 A | * | 4/1999 | Muller .......................... | 74/512 |
| 6,041,674 A | * | 3/2000 | Kato ............................ | 74/512 |
| 6,089,342 A | * | 7/2000 | Muller et al. ................ | 180/274 |
| 6,101,894 A | * | 8/2000 | Tiemann et al. .............. | 74/512 |
| 6,112,616 A | * | 9/2000 | Schonlau et al. ............. | 74/512 |
| 6,354,171 B1 | * | 3/2002 | Wolpert et al. ............... | 74/512 |

FOREIGN PATENT DOCUMENTS

| | | |
|---|---|---|
| DE | 195 15 852 A1 | 11/1995 |
| DE | 196 31 868 A1 | 2/1998 |
| DE | 197 31 644 C1 | 1/1999 |
| DE | 100 28 117 A1 | 12/2000 |
| EP | 0 827 874 A2 | 3/1998 |
| EP | 1 059 208 A2 | 12/2000 |

* cited by examiner

Primary Examiner—William O. Joyce
Assistant Examiner—Julie K. Smith
(74) Attorney, Agent, or Firm—McGlew and Tuttle, P.C.

(57) ABSTRACT

A device is provided for mounting a pedal lever (1) of a motor vehicle, which is accommodated in a housing (3) pivotably around at least one bearing element (2). At least one section of a separating wedge (5) is supported via a support surface (4) against a motor vehicle component (7) and brings about the shearing off of the bearing element (2) due to the action of an external force caused by an accident due to a relative movement between the separating wedge (5) and the bearing element (2) by applying a shearing force. The separating wedge (5) is accommodated between a surface of the housing (3) and the bearing element (2).

17 Claims, 3 Drawing Sheets

DEVICE FOR MOUNTING A PEDAL LEVER OF A MOTOR VEHICLE

FIELD OF THE INVENTION

The present invention pertains to a device for mounting a pedal lever for a motor vehicle which is accommodated in a housing pivotably around at least one bearing element.

BACKGROUND OF THE INVENTION

The increasing requirements imposed on motor vehicles in terms of increasing safety are seen in numerous systems. In pedal fastening means, there is a known risk for accidents in that a deformation of the engine compartment directly or indirectly affects the pedals and these are moved into the leg room of the motor vehicle. The serious injuries to the lower extremities, which can be caused by jamming between the pedals, can be considered to be the risks associated for the driver of the vehicle.

To avoid these risks of injury, separating mechanisms are known, which utilize the introduction of force from the outside, which is caused by the accident, to drive at least one separating wedge between two cheeks of a housing pivotably accommodating the pedal lever or the pedal levers in order to make possible as a result the release of the bearing bolt carrying the pedal lever. However, these solutions have not ultimately proved successful, because the mounting of such systems is rather complicated and at least the deformation areas must be made of metallic materials. However, it is advantageous in connection with the weight reduction of the assembly units present in the motor vehicle to manufacture the largest possible number of parts from light-weight materials, e.g., plastics.

SUMMARY AND OBJECTS OF THE INVENTION

The technical object of the present invention is to provide a device for mounting a pedal lever, which reduces the risk of injury and the degree of severity of the injuries to the driver of the vehicle.

This technical object is accomplished by a device of this type for mounting a pedal lever which is accommodated in a housing pivotably around at least one bearing element. At least one section of a separating wedge is supported via a support surface against a motor vehicle component and brings about the shearing off of the bearing element due to the action of an external force caused by an accident due to a relative movement between the separating wedge and the bearing element by applying a shearing force. This separating wedge is accommodated between a surface of the housing and the bearing element.

It can thus be achieved that as a consequence of the action of an external force, which is caused by an accident, a relative movement takes place between the separating wedge and the bearing element, which brings about the shearing off of the bearing element due to the application of a shearing force. This relative movement arises either from the deformation of the motor vehicle component or from the movement of the housing, which in turn originates from a deformation of parts of the motor vehicle. Consequently, the shearing off, i.e., the destruction of the bearing element, is correspondingly brought about deliberately according to the present invention in order to guarantee the necessary protection of the passengers. A bearing bolt or a bearing bush, which mount the pedal lever pivotably, may be used as a bearing element.

The device has, on the whole, a very simple design and can be manufactured nearly completely from light-weight materials, such as plastic. As such, there are hardly any limits to shaping.

According to one embodiment of the present invention, it is proposed that an abutment for contacting and slidingly movably guiding the separating wedge be provided at the housing. This abutment may have a ramp function, so that the separating wedge can exert its shearing action on the bearing element. At the same time, this abutment makes possible the clearance-free contact of the separating wedge between the abutment and the bearing element during normal operation.

To improve the shearing action, it is advantageous to provide the separating wedge with at least one wedge-shaped or arc-shaped active surface on the side facing the bearing element. As a result, it is possible to clearly define the point in time at which the bearing element is completely separated as a function of the path traveled by the separating wedge.

A variant of the present invention can, furthermore, be seen in the bearing element traversing two cheeks of the housing located at spaced locations from one another and by the pedal lever being arranged approximately in the middle between the cheeks on the bearing element. A distance is present now between the pedal lever and the respective associated cheek on both sides of the pedal lever, so that the separating wedge, which is provided with two legs in at least this area, is directly in contact with the bearing element, on the one hand, and with the abutment, on the other hand.

As was mentioned above, the relative movement between the separating wedge and the bearing element can also be achieved by the vehicle component to which the housing is fastened being deformed. It is correspondingly meaningful to fasten the housing at the front wall in the leg area on the driver's side of the motor vehicle, because the front wall is usually deformed relatively greatly in an accident, and the advantageous effect of the solution according to the present invention is achieved as a result at an early point in time. The motor vehicle component may be correspondingly the cross beam located closest.

To facilitate the shearing off, it is, moreover, appropriate and advantageous to provide the bearing element with at least one predetermined breaking point. Furthermore, the bearing element may be designed as a one-part or two-part bearing bolt. The two-part design has especially advantages in terms of mounting. However, it should be ensured in this case that each of the pin parts is shorn off by the separating wedge during the accident. However, a bearing bush, which can likewise be shorn off by the action of the shearing force, may also be considered to be a bearing element corresponding to the present invention.

Since the brake pedal of a motor vehicle is connected, e.g., to a brake booster and the latter has a brake rod, the deformation of the front wall in this area may have an especially strong effect, so that there is a risk that the pedal lever is moved into the passenger compartment by an unacceptable large amount before the shearing off of the bearing element. To counteract this situation, it is proposed that a blocking member, which limits the evading movement of the pedal in the direction of the passenger compartment during an accident, be provided at the housing in a solution according to the present invention.

To fix the separating wedge, which is normally inserted loosely between the cross beam and the pedal mount, a securing means for holding at the housing is, furthermore, provided between the separating wedge and the housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
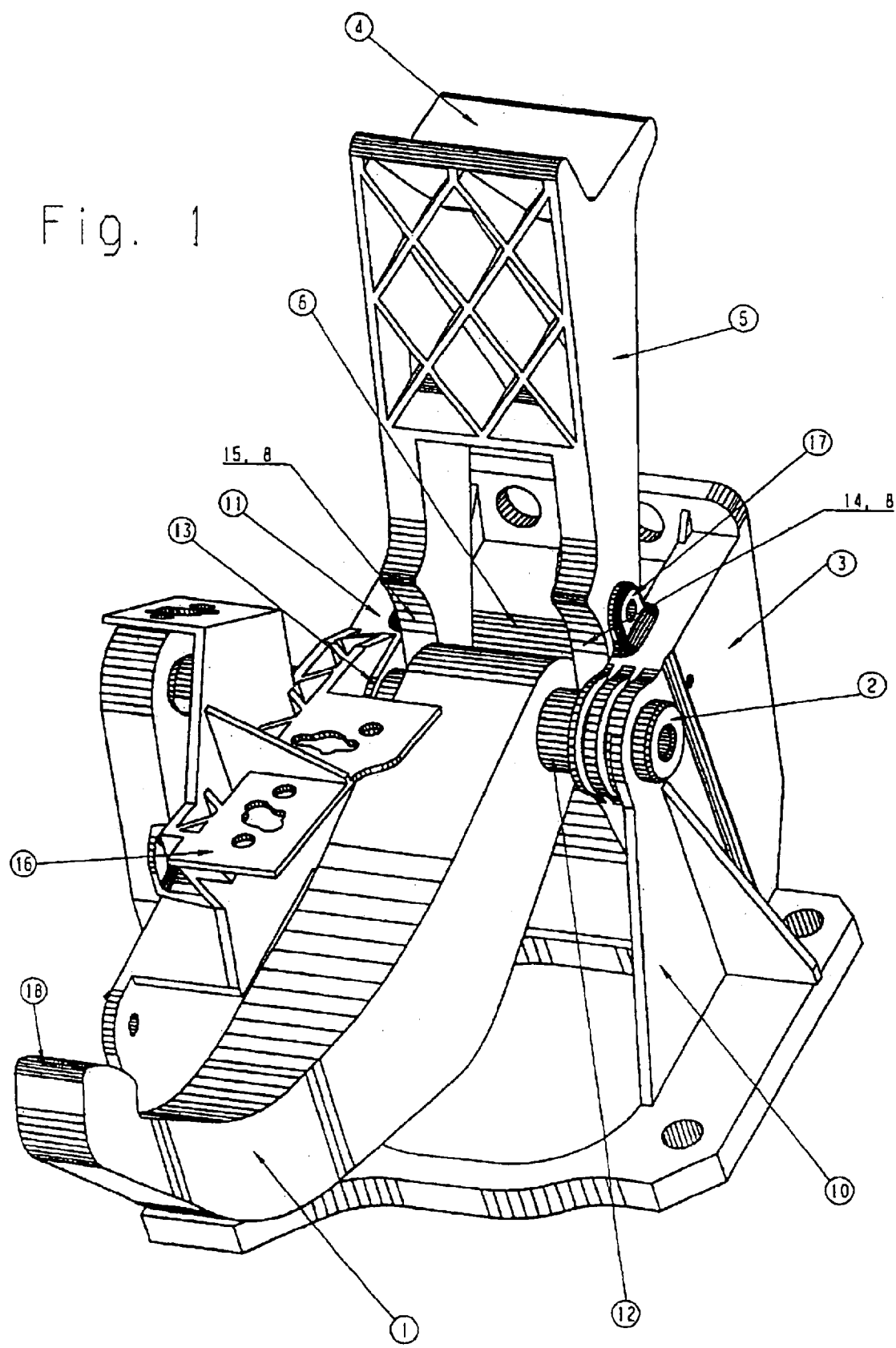
FIG. 1 is a three-dimensional view of a device for mounting a pedal lever.

Referring to the drawings in particular, for mounting a pedal lever 1 of a motor vehicle, the device shown in FIG. 1 contains a bearing element 2. The bearing element 2 is pivotably accommodated in a housing 3. The housing is fastened at the front wall of the motor vehicle in the leg area of the motor vehicle. A section of a separating wedge 5, is supported via a support surface 4 against a motor vehicle component 7. This section of a separating wedge 5 is accommodated between a surface of the housing 3 and the bearing element 2. The motor vehicle component 7 is a cross beam in this arrangement which is useful for contacting the separating wedge. This is because it is usually deformed only slightly even in serious accidents, so that a reliable, nearly constant support of the separating wedge 5 becomes possible. As is apparent, the separating wedge 5 is inserted loosely between the cross beam 7 and the contact area between the bearing element 2 and the housing 3. Complicated mounting can therefore be eliminated. A securing means 17 is provided that preferably consists of a soft material, so that the shearing action is not affected when needed. Each securing means 17 is present only as a means for protection against loss for the transport of the device at each leg between the separating wedge 5 and the housing 3.

The separating wedge 5 brings about the shearing off of the bearing element 2 as a consequence of the action of an external force caused by an accident due to a relative movement between the separating wedge 5 and the bearing element 2 by applying a shearing force. The separating wedge 5 comprises in the embodiment being shown a basic body with which two parallel legs 14, 15 are made in one piece. On the side facing the bearing element 2, these legs 14, 15 have an active surface 8 each. The active surface 8 was shaped as an arc-shaped contour in this case. The parallel arrangement of the legs is advantageous, because the shearing force can be applied uniformly on two different areas of the bearing element 2 under the action of the external force, so that the bearing element can be severed with certainty and reliably when this is necessary. The bearing element 2 traverses two cheeks 10, 11 of the housing 3. The two cheeks 10, 11 of the housing 3 are arranged at spaced locations from one another. The pedal lever 1 is arranged on the bearing element 2 approximately centrally between these cheeks 10, 11, so that there is a distance 12, 13 between the pedal lever 1 and the respective associated cheek 10 or 11 on both sides of the pedal lever 1. These distances 12, 13 form contact areas for the active surfaces 8 of the separating wedge 5 at the bearing element 2. The distances 12, 13 should not be substantially greater than the width of the legs 14, 15. On the side located opposite the active surface 8 of the separating wedge 5, the separating wedge 5 is in contact with a housing surface designed as an abutment 6.

Figure 2:
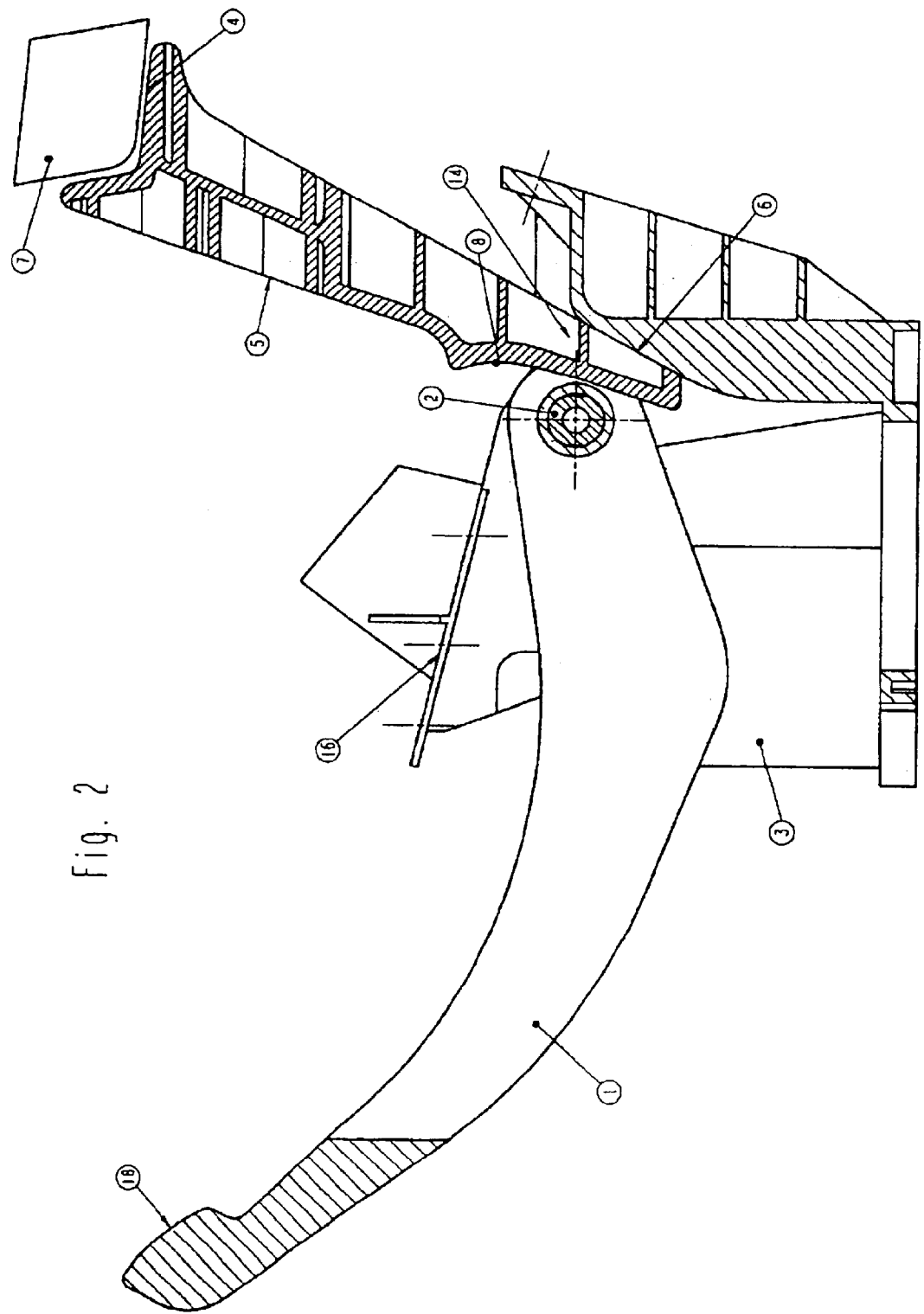
FIG. 2 is a sectional view of a device for mounting a pedal lever.

As is apparent from the sectional view in FIG. 2, the abutment 6 and the associated surface of the separating wedge 5 are flat surfaces, which permit the sliding movement of the components.

Figure 3:
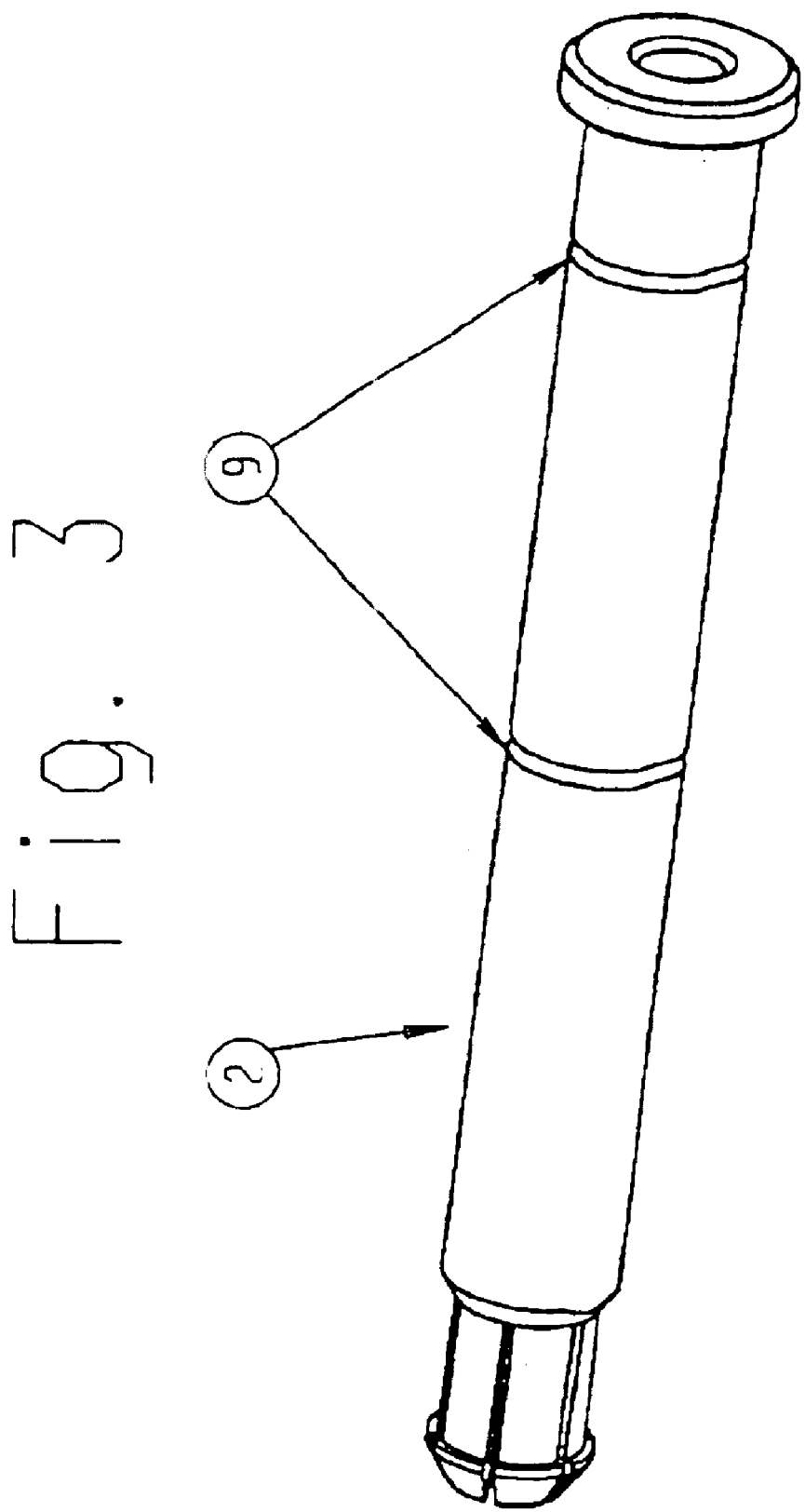
FIG. 3 is a bearing element for a device for mounting a pedal lever.

As is apparent from FIG. 3, the bearing element has two predetermined breaking points 9 and is designed as a one-part bearing bolt in this case.

To avoid an unacceptably wide movement of the pedal lever into the passenger compartment, a blocking member 16 is arranged at the housing 3. The blocking member limits the evading movement of the pedal in the direction of the interior space of the vehicle during an accident.

While specific embodiments of the invention have been shown and described in detail to illustrate the application of the principles of the invention, it will be understood that the invention may be embodied otherwise without departing from such principles.

What is claimed is:

1. A device for mounting a pedal lever of a motor vehicle, the device comprising:
   a housing with a surface;
   a bearing element; and
   a separating wedge supported via a separating wedge support surface against a motor vehicle component, said separating wedge bringing about the shearing off of said bearing element upon the action of an external force caused by an accident due to a relative movement between said separating wedge and said bearing element by applying a shearing force, is accommodated between said surface of the said housing and said bearing element, wherein said housing has an abutment for contacting and slidingly movably guiding said separating wedge and said separating wedge is provided with two legs and said bearing element traverses two cheeks of said housing, said two cheeks of said housing being located at spaced locations from one another, the pedal lever being arranged approximately cenrally between said cheeks on said bearing element, and a distance is provided between the pedal lever and the respective associated cheek of said housing on both sides of the pedal lever so said two lees of said separating wedge provided at least in an area of said two cheeks, is in contact with said bearing element and is in contact with said abutment.

2. A device for mounting a pedal lever in accordance with claim 1, wherein said separating wedge has a wedge-shaped or arc-shaped active surface on a side facing said bearing element.

3. A device for mounting a pedal lever in accordance with claim 1, wherein said housing is fastened to a front wall of the motor vehicle in the leg area of the driver's side of the motor vehicle, and the vehicle component is a cross beam.

4. A device for mounting a pedal lever in accordance with claim 1, wherein said bearing element has at least one predetermined breaking point and said bearing element is a one-part or two-part bearing bolt.

5. A device for mounting a pedal lever in accordance with claim 1, wherein said housing includes a blocking member which limits an evading movement of the pedal in the direction of the interior space of the vehicle.

6. A device for mounting a pedal lever in accordance with claim 1, wherein said separating wedge has a securing means for holding on said housing.

7. A device for mourning a pedal comprising:
a housing with an inner surface and two connected side walls defining a first space in between said connected side walls;
a bearing element mounted on said connected side walls along a fixed axis;
a separating wedge extending into said space and positioned in contact with said bearing element and said inner surface; and
a motor vehicle cross beam placed in contact with a top of said separating wedge, whereby said separating wedge shears off said bearing element from said housing upon a relative movement between said housing and said cross beam, wherein said housing inner surface forms an abutment for contacting and slidingly movably guiding said separating wedge and said separating wedge is provided with two legs and said bearing element traverses said two side walls provided as two cheeks of said housing, said two cheeks of said housing being located at spaced locations from one another, the pedal lever being arranged approximately centrally between said cheeks on said bearing element, and a distance is provided between the pedal lever and the respective associated cheek on both sides of the pedal lever so said two legs of said separating wedge provided at least in an area of said two cheeks, is in contact with said bearing element and is in contact with said abutment.

8. A device for mounting a pedal lever in accordance with claim 7, wherein said separating wedge has a wedge-shaped or arc-shaped active surface on a side acing said bearing element.

9. A device for mounting a pedal lever in accordance with claim 7, wherein said housing is fastened to a front wall of the motor vehicle in the leg area of the driver's side of the motor vehicle.

10. A device for mounting a pedal lever in accordance with claim 7, wherein said bearing element has at least one predetermined breaking point and said bearing element is at least one of a one-part and a two-part bearing bolt.

11. A device for mounting a pedal lever in accordance with claim 7, wherein said housing includes a blocking member which limits an evading movement of the pedal in the direction of the interior space of the vehicle.

12. A device for mounting a pedal lever in accordance with claim 7, wherein said separating wedge has a securing means for holding on said housing.

13. A method for safely shearing off a pedal in an accident, said method comprising:
providing a housing with an inner surface and two cheeks;
providing a bearing element mounted on said two cheeks along a fixed axis;
providing a separating wedge placed in a space between said side cheeks and between said inner surface and said bearing element; and
providing a motor vehicle component on top of said separating wedge, said motor vehicle component being a cross beam;
using said separating wedge to separate said bearing element from said side cheeks based on a force acting on said housing relative to said motor vehicle component cross beam and said separating wedge during an accident whereby said separating wedge separates said bearing element from said side cheeks, wherein said housing inner surface forms an abutment for contacting and slidingly movably guiding said separating wedge and said separating wedge is provided with two legs and said bearing element traverses said two cheeks of said housing, said two cheeks of said housing being located at spaced locations from one another, the pedal lever being arranged approximately centrally between said cheeks on said bearing element, and a distance is provided between the pedal lever and the respective associated cheek on both sides of the pedal lever so said two legs of said separating wedge provided at least in an area of said two cheeks, is in contact with said bearing element and is in contact with said abutment.

14. A method in accordance with claim 13, wherein said separating wedge has a wedge-shaped or arc-shaped active surface on a side facing said bearing element.

15. A method in accordance with claim 13, wherein said bearing element has at least one predetermined breaking point and said bearing element is at least one of a one-part and a two-part bearing bolt.

16. A method in accordance with claim 13, wherein said housing includes a blocking member which limits an evading movement of the pedal in the direction of the interior space of the vehicle.

17. A method in accordance with claim 13, wherein said separating wedge has a securing means for holding on said housing.

* * * * *